(12) United States Patent
Lin et al.

(10) Patent No.: US 10,915,079 B2
(45) Date of Patent: Feb. 9, 2021

(54) LIGHT SENSOR DEVICE CONTROLLED WITH DUAL-MODE MASTER-AND-SLAVE MCU APPLICATION

(71) Applicants: Dyna Image Corporation, New Taipei (TW); Lite-On Semiconductor Corp., Taipei (TW)

(72) Inventors: Chun-Hsien Lin, New Taipei (TW); Peng-Han Chan, New Taipei (TW); Wen-Sheng Lin, New Taipei (TW); Yu-Cheng Su, Taipei (TW); Sheng-Cheng Lee, New Taipei (TW)

(73) Assignees: Dyna Image Corporation, New Taipei (TW); Lite-On Semiconductor Corporation, Taipei (TW)

( * ) Notice: Subject to any disclaimer, the term of this patent is extended or adjusted under 35 U.S.C. 154(b) by 173 days.

(21) Appl. No.: 16/386,377

(22) Filed: Apr. 17, 2019

(65) Prior Publication Data
US 2020/0333754 A1    Oct. 22, 2020

(51) Int. Cl.
*G01J 1/44* (2006.01)
*G05B 19/042* (2006.01)
*G06F 13/42* (2006.01)

(52) U.S. Cl.
CPC .............. *G05B 19/042* (2013.01); *G01J 1/44* (2013.01); *G06F 13/4282* (2013.01); *G05B 2219/2231* (2013.01); *G05B 2219/25257* (2013.01); *G06F 2213/0016* (2013.01)

(58) Field of Classification Search
CPC .......... G05B 19/042; G05B 2219/2231; G05B 2219/25257; G01J 1/44; G06F 13/4282; G06F 2213/0016
See application file for complete search history.

(56) References Cited

U.S. PATENT DOCUMENTS

| 2008/0036401 A1* | 2/2008 | Erhardt ................ H05B 47/175 315/349 |
| 2017/0150584 A1* | 5/2017 | Motley ................. H05B 45/37 |
| 2017/0235692 A1* | 8/2017 | Ahamed ................ G06F 1/325 710/308 |

* cited by examiner

*Primary Examiner* — Thanh Luu
*Assistant Examiner* — Monica T Taba
(74) *Attorney, Agent, or Firm* — JCIPRNET

(57) ABSTRACT

A light sensor device is provided. It is controlled with a dual-mode master-and-slave microcontroller unit (MCU) application. An MCU is embedded into a light sensor chip. The original dual-mode master-and-slave dual-CPU architectures are combined to be operated as a single-CPU architecture. Since the original circuit pin design is followed, it is possible to be compatible with the old circuit design. The present invention uses a single-CPU architecture to directly control light sensors. Through the configuration of RAM, an inter-integrated circuit bus (I²C I/F) can be redirected to an internal non-volatile memory to switch the operational mode of the light sensor chip from a slave machine to a host machine which switches off the interrupt pin and, then, turns to a GPIO pin. Thus, the present invention provides a simple single-CPU architecture with easy use and effectively-lowered cost.

9 Claims, 3 Drawing Sheets

LIGHT SENSOR DEVICE CONTROLLED WITH DUAL-MODE MASTER-AND-SLAVE MCU APPLICATION

TECHNICAL FIELD OF THE INVENTION

The present invention relates to a light sensor device; more particularly, to operational modes of the light sensor device, where a microcontroller unit (MCU) is embedded into a light sensor chip to control light sensors by the MCU.

DESCRIPTION OF THE RELATED ARTS

A light sensor is a sensor using a photosensitive device to turn sensor signal into telecommunication signal. The light sensors usually consist of a group of light projectors and light receivers. The light projector focuses the light through a lens to be transmitted to the light receiver, and, then, further transmitted to the sensor. The sensor turns the received light signal into a telecommunication signal, where the telecommunication signal can further operate various switches and controls. In another word, the basic principle of the light sensor is to use the signal obtained from the light change between light projector and light receiver for accomplishing a variety of automated control. The light sensor replaces contacting detection methods like limit switch, where any sensor processes detection without contacting the detected object is called a proximity sensor. Its principle is to turn the motion data or presence data of the detected object into electrical signals.

So far, the operational mode of the light sensor is still switched on/off through a microcontroller; that is, its operation always requires the microcontroller for waking up, which makes the overall main cost expensive. FIG. 3 shows a master/slave structure, where two CPUs are used. A master machine controls a slave machine of light sensors through an inter-integrated circuit ($I^2C$) protocol. This prior art itself has a CPU 31 of the master machine 3 and a microcontroller 41 of the slave machine 4. The CPU 31 of the master machine 3 is the CPU controlling the internal light sensors. The microcontroller 41 of the slave machine 4 is the CPU used to control external configuration adjustment. Thus, a dual-CPU control mode is formed. However, the conventional configuration adjustment of the microcontroller 41 in the prior art is not used to control the light sensors 32; instead, the CPU 31 of the master machine 3 is used to control the light sensors 32. As a result, the bill of materials (BOM) is still high owing to the lack of a cheap sensor structure.

Hence, the prior arts do not fulfill all users' requests on actual use.

SUMMARY OF THE INVENTION

The main purpose of the present invention is to embed an MCU into a light sensor chip, where the original dual-mode master-and-slave dual-CPU architectures are combined to be operated as a single-CPU architecture; and, since the original circuit pin design is followed, it is possible to be compatible with the old circuit design.

Another purpose of the present invention is to use the single-CPU architecture to directly control light sensors, where, through controlling the configuration of register by the light sensor chip, an $I^2C$ bus can be redirected to an internal non-volatile memory to switch the operational mode of the light sensor chip from a slave machine to a host machine which switches off the interrupt pin and, then, turns to a GPIO pin; and, thus, the present invention provides a simple single-CPU architecture with easy use and effectively-lowered cost.

To achieve the above purposes, the present invention is a light sensor device controlled with a dual-mode master-and-slave MCU application, comprising a light sensor area, an analog front-end (AFE) circuit, an MCU, a memory arbiter, a second memory, an $I^2C$ bus ($I^2C$ I/F), a third memory, a fourth memory, and a memory interface circuit, where the light sensor area comprises a plurality of light sensors; the AFE circuit electrically connects to the light sensor area to photoelectrically convert and analogically trim parameters of the light sensors; the MCU electrically connects to the AFE circuit; the MCU is a software state machine comprising a first memory and an I/O communication interface; the first memory stores a program of the software state machine; the memory arbiter electrically connects to the the MCU to receive a plurality of microinstructions related to a plurality of memories, separately; bases on an arbitration procedure, a sequence of the microinstructions are selected and processed; and each processed one of the microinstructions builds access to one of the memories and an address assigned to the each processed one of the microinstructions; the second memory electrically connects to the memory arbiter and is stored with a plurality of settings of functional controls of light sensors; the $I^2C$ bus electrically connects to the memory arbiter; the $I^2C$ bus is a communication interface connecting to an external device and having a register; and all of the settings for calculation are stored in the second memory and the register; the third memory is built in with trim values as AFE trimming parameters to trim the light sensors by the AFE circuit controlled by the MCU; the fourth memory is configured as a memory comprising a unit of a single bit and the single bit is set to decide the settings to be calculated in a slave mode or a single-chip mode; the memory interface circuit electrically connects to the memory arbiter, the third memory, and the fourth memory to obtain memory channel addresses based on the microinstructions processed by the memory arbiter to access the third memory and the fourth memory; and where a light sensor chip obtained with the above components continuously reads data of the third memory and the fourth memory to be stored into the second memory; and the MCU obtains the data of the third memory and the fourth memory and checks a state of the single bit, where, when the single bit has the state of 0, the data of the fourth memory read out does not substitute the settings of functional controls of light sensors in the second memory; an operational mode of the light sensor chip enters into a slave mode to be a slave machine; the I/O communication interface is obtained as an INT interface; the external device connected with the $I^2C$ bus is obtained as a master machine; and the light sensors are controlled by operational commands of the external device waited by the $I^2C$ bus; and, when the single bit has the state of 1, the data of the fourth memory read out substitutes the settings of functional controls of light sensors in the second memory; the operational mode of the light sensor chip enters into a single-chip mode; the settings in the second memory are redirected from the $I^2C$ bus to the third memory and the fourth memory to control the light sensors by the MCU; and the I/O communication interface is turned from the INT interface of the slave mode into a GPIO interface. Accordingly, a novel light sensor device controlled with a dual-mode master-and-slave MCU application is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
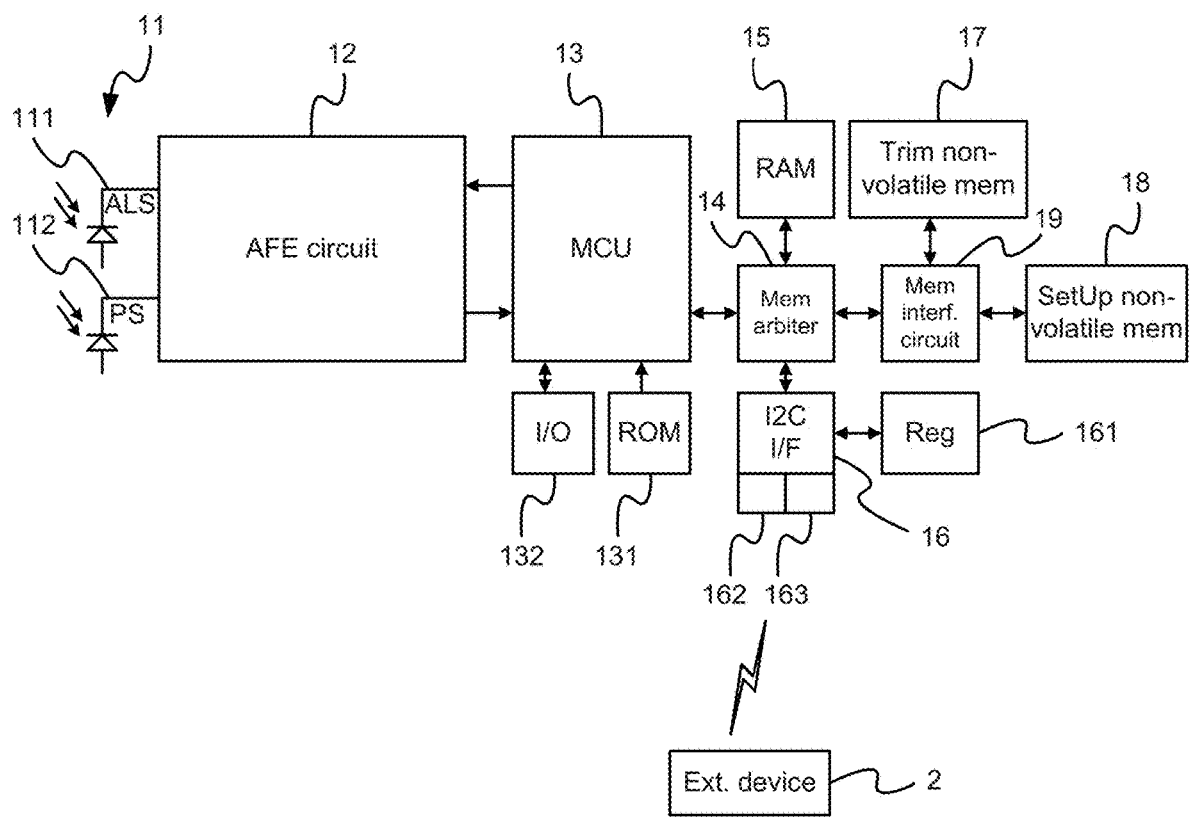
FIG. 1 is the structural view showing the preferred embodiment according to the present invention.
Figure 2:
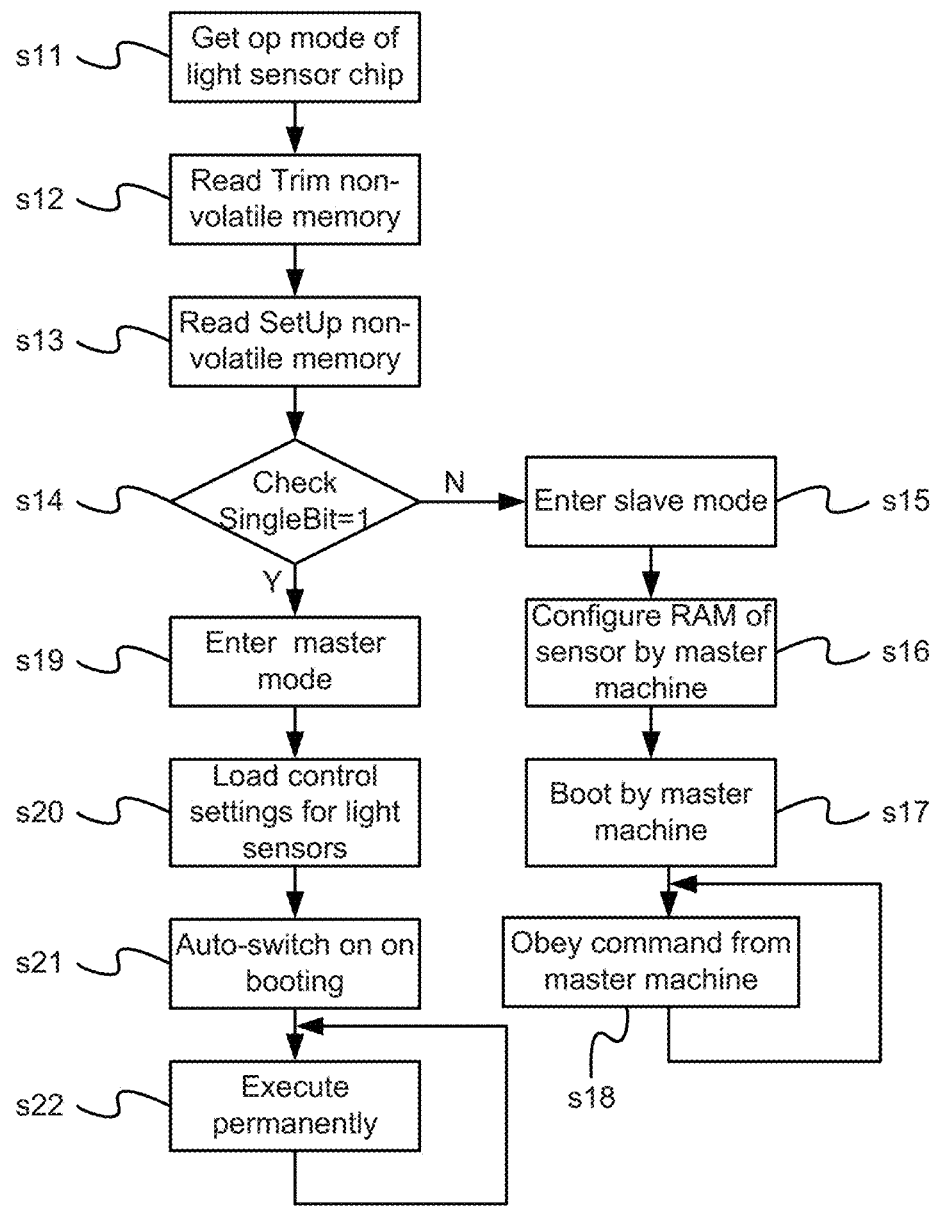
FIG. 2 is the flow view showing the operation.
Figure 3:
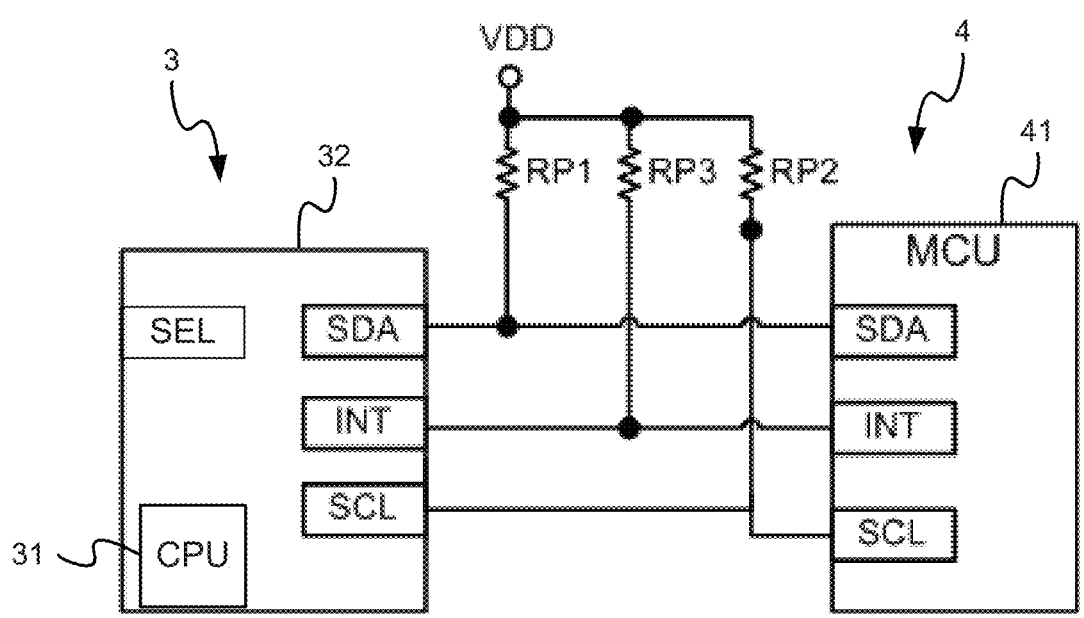
FIG. 3 is the view of the prior art.

Please refer to FIG. 1 and FIG. 2, which are a structural view showing a preferred embodiment according to the present invention; and a flow view showing an operation. As shown in the figures, the present invention is a light sensor device controlled with a dual-mode master-and-slave microcontroller unit (MCU) application, comprising a light sensor area 11, an analog front-end (AFE) circuit 12, an MCU 13, a memory arbiter 14, a random access memory (RAM) 15, an inter-integrated circuit (I²C) bus (I²C I/F) 16, a Trim non-volatile memory 17, a SetUp non-volatile memory 18, and a memory interface circuit 19.

The light sensor area 11 is set with a plurality of light sensors 111,112, including ambient light sensor (ALS) and proximity sensor (PS).

The AFE circuit 12 electrically connects to the light sensors 111,112 in the light sensor area 11 to photoelectrically convert and analogically trim parameters of the light sensors 111,112.

The MCU 13 electrically connects to the AFE circuit 12. The MCU 13 is a software state machine having a read-only memory (ROM) 131 and an I/O communication interface 132. The ROM 131 stores a program of the software state machine.

The memory arbiter 14 electrically connects to the MCU 13 to receive a plurality of microinstructions separately related to the memories; bases on an arbitration procedure, a sequence of the microinstructions are selected and processed; and each processed one of the microinstructions builds access to one of the memories and an address assigned to the processed microinstruction.

The RAM 15 electrically connects to the memory arbiter 14 and is stored with a plurality of settings of functional controls of light sensors. The settings calibrate the light sensors and control register setting.

The I²C bus 16 electrically connects to the memory arbiter 14. The I²C bus 16 is a communication interface connecting to an external device 2 and having a register 161; and all of the settings for calculation are stored in the RAM 15 and the register 161. Therein, the I²C bus 16 has an SDA/SCL interface 162 and a SEL interface 163.

The Trim non-volatile memory 17 is built in with trim values as AFE trimming parameters to trim the light sensors 111,112 by the AFE circuit 12 controlled by the MCU 13.

The SetUp non-volatile memory 18 is configured into a single-bit unit memory, which is burned with a data of a single bit. The single bit is set to decide the settings to be calculated in a slave mode or a single-chip mode.

The memory interface circuit 19 electrically connects to the memory arbiter 14, the Trim non-volatile memory 17, and the SetUp non-volatile memory 18 to obtain memory channel addresses based on the microinstructions processed by the memory arbiter 14 to access the Trim non-volatile memory 17 and the SetUp non-volatile memory 18. A light sensor chip is formed with the above components. Thus, a novel light sensor controlled with a dual-mode master-and-slave MCU application is obtained.

On using the present invention, the light sensor chip 1 is set to be in a slave mode in default in a factory test (FT) phase. The Trim non-volatile memory 17 is burned with trim values after the FT phase to calibrate the light sensors 111,112 only. If the single bit of the SetUp non-volatile memory 18 is not burned and, therefore, has a state of 0, the data of the SetUp non-volatile memory 18 is read out but does not substitute the settings of functional controls of light sensors in the RAM 15 and the slave mode is entered into on booting. If the single bit is burned by an end user and, therefore, has the state of 1, the data of the SetUp non-volatile memory 18 is read out to process substitution of the settings of functional controls of light sensors in the RAM 15 and the single-chip mode is entered into on booting. The I/O communication interface 132 is turned from an INT interface of the slave mode into a GPIO interface to be reset into an output OBJ state bit. Moreover, the SDA/SCL interface 162 of the I²C bus 16 is abandoned while a connection of VDD 3.3V is required; and the SEL interface 163 is released to be use as a GPIO interface or is removed. Besides, the end user can obtains best ones of the settings of functional controls of light sensors in advance through testing in the slave mode; and, then, burns the single bit into 1 through the I²C bus 16, i.e. into the state of 1.

As shown in FIG. 2, the light sensor chip 1 in a smart sensor switches on in step s11. Data of the Trim non-volatile memory 17 and the SetUp non-volatile memory 18 are continuously read out to be stored into the RAM 15 in step s12 and s13. The MCU 13 obtains the readout data of the Trim non-volatile memory 17 and the SetUp non-volatile memory 18 and checks a state of the single bit in step s14. When the single bit has the state of 0, the readout data of the SetUp non-volatile memory 18 does not process substitution of the settings of functional controls of light sensors in the RAM 15; the light sensor chip 1 is operated in the slave mode to be a slave machine in step s15; the I/O communication interface 132 is used as the INT interface; the external device 2 connected with the I²C bus 16 is obtained as a master machine; the light sensors 111,112 are controlled by operational commands of the external device 2, which are waited by the I²C bus 16; in step s16, the master machine configures the RAM; then, the master machine commands a booting process in s17; and the command of the master machine is obeyed in step s18. Or, when the single bit has the state of 1, the light sensor chip 1 is operated in the single-chip mode, whose operational mode is switched from a slave device to a host device; the readout data of the SetUp non-volatile memory 18 substitutes the settings of functional controls of light sensors in the RAM 15 for loading unique control settings for the light sensors 111,112 in step s20; after the smart sensor reboots, the light sensor chip 1 automatically switches on the settings of the RAM 15 to permanently execute in step s21,s22 and redirect from the I²C bus 16 to the Trim non-volatile memory 17 and the SetUp non-volatile memory 18 to control the light sensors 111,112 by the MCU 3; and the interrupt pin is switched off to turn the I/O communication interface 132 from the INT interface of the slave mode into a GPIO interface.

The present invention embeds an MCU into a light sensor chip. The original dual-mode master-and-slave dual-CPU architectures are combined to be operated as a single-CPU architecture. Since original circuit pin design is followed, it is possible to be compatible with old circuit design. The present invention uses a single-CPU architecture to directly control light sensors. Through controlling the configuration of register by the light sensor chip, an I²C bus can be redirected to an internal non-volatile memory to switch the operational mode of the light sensor chip from a slave machine to a host machine which switches off interrupt pin and, then, turns to GPIO pin. Thus, the present invention provides a simple single-CPU architecture with easy use and effectively-lowered cost.

To sum up, the present invention is a light sensor device controlled with a dual-mode master-and-slave MCU application, where an MCU is embedded into a light sensor chip; the original dual-mode master-and-slave dual-CPU architectures are combined to be operated as a single-CPU architecture while the original circuit pin design is followed; the single-CPU architecture is used to directly control light sensors; through controlling the configuration of register by the light sensor chip, an I²C bus can be redirected to an internal non-volatile memory to switch the operational mode of the light sensor chip from a slave machine to a host machine; and, thus, the present invention provides a simple architecture with easy use and effectively-lowered cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A light sensor device controlled with a dual-mode master-and-slave microcontroller unit (MCU) application, comprising
   a light sensor area,
      wherein said light sensor area comprises a plurality of light sensors;
   an analog front-end (AFE) circuit,
      wherein said AFE circuit electrically connects to said light sensor area to photoelectrically convert and analogically trim parameters of said light sensors;
   an MCU,
      wherein said MCU electrically connects to said AFE circuit; said MCU is a software state machine comprising a first memory and an I/O communication interface; and said first memory stores a program of said software state machine;
   a memory arbiter,
      wherein said memory arbiter electrically connects to said MCU to receive a plurality of microinstructions separately related to a plurality of memories; bases on an arbitration procedure, a sequence of said microinstructions are selected and processed; and each processed one of said microinstructions builds access to one of said memories and an address assigned to said microinstruction processed;
   a second memory,
      wherein said second memory electrically connects to said memory arbiter and is stored with a plurality of settings of functional controls of light sensors;
   an inter-integrated circuit (I²C) bus (I²C I/F),
      wherein said I²C bus electrically connects to said memory arbiter; said I²C bus is a communication interface connecting to an external device and having a register; and all of said settings of calculation are stored in said second memory and said register;
   a third memory,
      wherein said third memory is built in with trim values as AFE trimming parameters to trim said light sensors by said AFE circuit controlled by said MCU;
   a fourth memory,
      wherein said fourth memory is configured as a memory comprising a unit of a single bit and said single bit is obtained to decide said settings to be calculated in a mode selected from a group consisting of a slave mode and a single-chip mode; and
   a memory interface circuit,
      wherein said memory interface circuit electrically connects to said memory arbiter, said third memory, and said fourth memory to obtain memory channel addresses based on said microinstructions processed by said memory arbiter to access said third memory and said fourth memory,
   wherein a light sensor chip obtained with the above components continuously reads data of said third memory and said fourth memory to be stored into said second memory; and said MCU obtains said data of said third memory and said fourth memory and checks a state of said single bit,
   wherein, when said single bit has said state of 0, said data of said fourth memory read out does not substitute said settings of functional controls of light sensors in said second memory; an operational mode of said light sensor chip enters into a slave mode to be a slave machine; said I/O communication interface is obtained as an INT interface; said external device connected with said I²C bus is obtained as a master machine; and said light sensors are controlled by operational commands of said external device waited by said I²C bus; and
   when said single bit has said state of 1, said data of said fourth memory read out substitutes said settings of functional controls of light sensors in said second memory; said operational mode of said light sensor chip enters into a single-chip mode; said settings in said second memory are redirected from said I²C bus to said third memory and said fourth memory to control said light sensors by said MCU; and said I/O communication interface is turned from said INT interface of said slave mode into a GPIO interface.

2. The light sensor according to claim 1, wherein said light sensors are of ambient light sensor (ALS) and proximity sensor (PS).

3. The light sensor according to claim 1, wherein said first memory is a read-only memory (ROM); said second memory is a random access memory (RAM); said third memory is a Trim non-volatile memory; and said fourth memory is a SetUp non-volatile memory.

4. The light sensor according to claim 1, wherein said settings calibrate said light sensors and control register setting.

5. The light sensor according to claim 1, wherein said light sensor chip is set to be in a slave mode in default in a factory test (FT) phase; said third memory is burned with trim values after said FT phase to calibrate said light sensors only; if said single bit of said fourth memory is not burned and, therefore, has said state of 0, said data of said fourth memory read out does not substitute said settings of functional controls of light sensors in said second memory and said slave mode is entered into on booting; and if said single bit of said fourth memory is burned by an end user and, therefore, has said state of 1, said data of said fourth memory read out substitutes said settings of functional controls of light sensors in said second memory and said single-chip mode is entered into on booting; and said settings of said second memory are redirected from said I²C bus to said third memory and said fourth memory.

6. The light sensor according to claim 5,
wherein said end user obtains best ones of said settings of functional controls of light sensors through testing in advance in said slave mode and, then, burns said single bit through said I²C bus to obtain said state of 1.

7. The light sensor according to claim 1,
wherein said INT interface is switched into said GPIO interface to be reset into an output OBJ state bit.

8. The light sensor according to claim 1,
wherein said I²C bus has an SDA/SCL interface which is abandoned and connected as VDD on being processed in said single-chip mode.

9. The light sensor according to claim 1,
wherein said I²C bus has an SEL interface which, on being processed in said single-chip mode, is processed in a way selected from a group consisting of (I) being released to be used as said GPIO interface and (ii) being removed.

\* \* \* \* \*